(12) United States Patent
Hurt (10) Patent No.: US 12,144,291 B2
(45) Date of Patent: Nov. 19, 2024

(54) TRELLISING SYSTEM CONSTITUTING INTEGRATED DUAL LAYER STRUCTURAL UNITS FOR GROWING CROPS

(71) Applicant: Paul Eric Hurt, Sheffield (GB)

(72) Inventor: Paul Eric Hurt, Sheffield (GB)

( * ) Notice: Subject to any disclaimer, the term of this patent is extended or adjusted under 35 U.S.C. 154(b) by 0 days.

(21) Appl. No.: 18/532,684

(22) Filed: Dec. 7, 2023

(65) Prior Publication Data
US 2024/0188511 A1    Jun. 13, 2024

Related U.S. Application Data

(60) Provisional application No. 63/386,460, filed on Dec. 7, 2022.

(51) Int. Cl.
| | |
|---|---|
| *A01G 17/06* | (2006.01) |
| *A01G 9/033* | (2018.01) |
| *A01G 13/02* | (2006.01) |
| *A01G 25/02* | (2006.01) |

(52) U.S. Cl.
CPC ............. *A01G 17/06* (2013.01); *A01G 9/033* (2018.02); *A01G 13/0206* (2013.01); *A01G 25/02* (2013.01); *A01G 2017/065* (2013.01)

(58) Field of Classification Search
CPC .. A01G 17/04; A01G 17/06; A01G 2017/065; A01G 9/033; A01G 13/0206; A01G 25/02
See application file for complete search history.

(56) References Cited

U.S. PATENT DOCUMENTS

| | | | | |
|---|---|---|---|---|
| 1,916,868 | A * | 7/1933 | Starks | A01G 13/0231 403/207 |
| 3,807,089 | A * | 4/1974 | Senese | A01G 17/06 248/219.2 |
| 4,665,646 | A * | 5/1987 | Anderson | A01G 13/0231 47/21.1 |
| 7,461,479 | B2 * | 12/2008 | Gaudet, Sr. | A01G 13/0231 47/46 |
| 7,818,915 | B1 * | 10/2010 | Flaishman | A01G 17/06 47/58.1 FV |
| 10,136,589 | B2 * | 11/2018 | Bortolussi | A01G 17/14 |
| 10,631,471 | B2 * | 4/2020 | Lamoureux | F24H 15/31 |
| 10,779,480 | B2 * | 9/2020 | Schurter | A01G 17/005 |

(Continued)

FOREIGN PATENT DOCUMENTS

| | | | |
|---|---|---|---|
| DE | 102020004880 A1 * | 2/2022 | |
| KR | 20120052109 A * | 5/2012 | |

(Continued)

*Primary Examiner* — Monica L Perry
*Assistant Examiner* — Aaron M Rodziwicz (57) ABSTRACT

A trellising system comprises a dual layer structure, including an outer layer and an inner layer. The system includes at least one core structure-group, a plurality of main wires, and an anchorage structure. The core structure-group comprises a plurality of growing units. The main wires, which extend along an entire length of a row constituted by the core structure-groups, include an upper sheet wire, an upper trellis wire, and optionally an overhead conveyor wire. One terminal end of each of the main wires is attached to the anchorage structure. The outer layer makes an outer support sub-system to support a plurality of sheet materials. The inner layer makes a trellis support sub-system to support plant growth.

9 Claims, 11 Drawing Sheets

(56) References Cited

U.S. PATENT DOCUMENTS

| | | | | |
|---|---|---|---|---|
| 2004/0049976 A1* | 3/2004 | Maffei | ............... | A01G 13/0231 47/20.1 |
| 2006/0272202 A1* | 12/2006 | Gaudet | .............. | A01G 13/0231 47/31 |
| 2013/0160357 A1* | 6/2013 | Luciano, Jr. | ........... | A01G 17/06 47/2 |
| 2016/0165814 A1* | 6/2016 | Parrish | ................... | A01G 17/06 47/46 |
| 2017/0118924 A1* | 5/2017 | Parrish | ................... | A01G 9/126 |
| 2017/0347540 A1* | 12/2017 | Sowinski | ................ | A01G 17/06 |
| 2018/0168118 A1* | 6/2018 | Redmond | .......... | G06K 7/10366 |
| 2018/0177141 A1* | 6/2018 | Lamoureux | ............ | A01G 22/05 |
| 2018/0288951 A1* | 10/2018 | Di Battista | ............ | A01G 17/06 |
| 2020/0010309 A1* | 1/2020 | Atsumi | .................... | B66D 1/40 |
| 2020/0029507 A1* | 1/2020 | Carlson | .............. | A01G 13/0206 |
| 2022/0201944 A1* | 6/2022 | Zeibak | .................... | A01G 17/06 |

FOREIGN PATENT DOCUMENTS

| | | | | |
|---|---|---|---|---|
| WO | WO-2014174417 A2 * | 10/2014 | ............. | A01G 17/06 |
| WO | WO-2020032817 A1 * | 2/2020 | | |
| WO | WO-2021021916 A1 * | 2/2021 | ......... | A01G 13/0206 |
| WO | WO-2021105877 A1 * | 6/2021 | ......... | A01G 13/0206 |

\* cited by examiner

TRELLISING SYSTEM CONSTITUTING INTEGRATED DUAL LAYER STRUCTURAL UNITS FOR GROWING CROPS

FIELD OF INVENTION

The present invention relates generally to a trellising system that assists growing and water conservation within agriculture. More specifically, the present invention is a trellising system with modifiable components and configurations for growing, protected cropping, protected working, materials handling, water collecting and water conservation for use in vineyards and orchards and as a polytunnel substitute.

BACKGROUND OF THE INVENTION

In vineyards, protected cropping is usually conspicuous by its absence, although there are sometimes inconsequential interventions, such as draping some horticultural fleece over some of the rows or parts of rows. The overwhelmingly common trellising systems for grape vines make use of wires supported by posts, tension being maintained by various methods. These wires have the function of supporting the grape vines and positioning the vines for the essential tasks of a vineyard, including pruning and harvesting of the grapes. The wires making up the trellising system are almost exclusively for support of the grape vines, even if they do have some subsidiary uses: the draping of horticultural fleece, the support of irrigation pipes, the support of pipes conveying water to the vines not for irrigation but, by freezing of the water, for attempted prevention of frost damage.

Effective protected cropping is impossible in the established—almost universal—systems of vine trellising, as well as in marginal systems of trellising. For example, 'single curtain' trellis systems and 'double curtain' trellis systems, such as the Geneva Double Curtain, which manages a dense canopy by dividing it in two, so that more sunlight can reach the renewal zone. However, this system can be more costly to establish than other systems and needs careful maintenance. Whatever benefits and disadvantages a particular trellising system may have the disadvantage is that they fail to provide protection for grape vines, except for marginal benefits in some cases, and fail to provide adequate protection for workers who tend the vines. The effects of frost damage in grape-growing regions are documented. The buds on the vines are sometimes entirely destroyed by Spring frosts, so that there is no crop at all that year, sometimes the damage is partial, of different degrees of severity. Very severe damage to buds may occur at this time in areas which generally have a mild climate, such as the Bordeaux area of France, or vineyards in California.

The methods which are employed in an attempt to combat frost damage all have marked disadvantages. For example, the use of water which freezes has not only the disadvantage of being expensive to install but the disadvantage of using large volumes of water, very problematic at a time when problems of water supply have become acute. Another method of (supposed) prevention relies upon open fires or very large candles, an inefficient form of heating in the open air and again, expensive to implement. The best and most realistic form of protection would be to make use of the plastic sheets which are used in polytunnel protection, but in existing trellising systems satisfactory support of these sheet materials is not possible.

Plastic sheets are the best and most realistic form of protection against frost and some other problems, such as impairment of the quality of grape vines by excessive water at harvesting time. They would also be the best and most realistic form of protection for vineyard workers, who are expected to prune in the cold of winter and to harvest grapes in downpours of rain in the autumn—or to delay their work until conditions become more favorable. Work at the height of summer would be more pleasant, grape vines would have a lower risk of damage from excessive solar heating if it were possible to install solar netting easily, but existing systems make this a matter of some difficulty.

However, the lack of provision for installation of sheet materials, in particular plastic sheeting and also solar netting, does at least preserve the aesthetic appeal of vineyards, for most people who work there, visit, or have an interest in the subject. Unlike polytunnels, vineyards generally enhance the appearance of the countryside.

Provision for material handling is lacking in existing vineyard trellising systems. Workers are often expected to carry very heavy loads, leading to muscular and other problems. In industry, sophisticated techniques of bulk handling make the avoidance of these and other dangers far less likely.

The advantages and disadvantages already outlined for vineyards apply to a significant extent to apple orchards. Many commercial orchards are made up of individual trees which are quite widely separated from each other. The trees may be in rows or may be in a scattered configuration. It is possible to protect individual trees with horticultural fleece but not realistic to protect most of the trees in this way. Another method of apple production relies upon wires similar to the trellises of vineyard production. Here, the trees are small and trained to grow on the wires. The advantages and disadvantages of this orchard system are the advantages and disadvantages of any of the vineyard trellising systems in use, although in some cases, the possibility of frost damage can be largely discounted: the buds of apples grown for hard cider production generally appear after the risk of frost is over.

However, whatever the kind of apple, there is a disadvantage of potentially harvesting the apples in very adverse weather conditions, even with early maturing apples. Hard cider apples are likely to be harvested at a time when the risk of adverse weather is much greater. Whether the apples are cider apples, dessert apples, or cooking apples, the established systems used in orchards, like the systems used in vineyards, often do little or nothing to alleviate the physical demands of the work. The supposition that they cannot be alleviated or that they are necessary is quite common.

One advantage of the orchard trellising systems shared with the vine growing systems is the aesthetic advantage. This form of apple growing, like the one which relies upon more widely separated apple trees not grown on trellises, is generally agreed to enhance the appearance of a locality, not to detract from it.

Polytunnels are used on an enormous scale for the commercial growing of crops—strawberries, lettuces, raspberries, tomatoes, and many others. This form of protected cropping has many advantages. One obvious advantage is that an increase in internal temperature by the greenhouse effect can effectively protect crops against frost damage in many conditions if not all. The shelter provided by polytunnels can protect crops against moisture-related fungal diseases, such as botrytis, downy mildew, and blackspot, reducing the need to spray with fungicides. It is claimed that the enclosed environment of the polytunnel increases the effectiveness of any pesticides used and reduces the risk of spray drifting away from the targeted crop and causing non-intended damage to plants other than the targeted crop. Polytunnels offer substantial benefits to agricultural workers, who are able to carry out pruning, harvesting and other essential work whilst being protected from very cold and windy weather. In the 'tabletop' system, often used in the growing of strawberries, the growing medium (e. g. coir) is in gutters or other containers at a convenient height, often of the order of 1.1 meter. This method can only be realistically used in systems of protected cropping as a polytunnel substitute.

However, polytunnels do have substantial disadvantages. Some of these are increased in severity by extreme weather conditions that have become more and more common. The disadvantages include excess temperatures, often greatly in excess, from the optimal temperatures for growing (typically of the order of 26-30 Celsius, although different crops have different requirements.) When the environmental temperature reaches 35 Celsius, 40 Celsius, or even higher, then the temperature inside a polytunnel will be considerably higher. More often than not, polytunnels have inadequate provision for ventilation which would mitigate these conditions, which can lead to substantially impaired growth or even the death of plants.

Installing protective shading is often far from easy. The frame of polytunnels and the method of attachment of the plastic insulating material have great strength in well-designed polytunnels but the strength may well be insufficient to prevent damage from strong winds and accumulation of snow: polytunnels tend to have weaknesses in shedding snow.

The plants in a polytunnel have to be irrigated to survive. These irrigation methods are expensive to implement. It is possible to collect water from the roofs of polytunnels and to use the collected water to irrigate the plants, but arrays of polytunnels are not well adapted to collect and conserve the water which falls on them. Furthermore, the plants growing in polytunnels are unable to make use of the benefits of natural precipitation.

It is generally recognized that polytunnels have few—or no—aesthetic merits. People in communities which have large commercial polytunnel complexes nearby often resent the fact. Proposed development of polytunnel growing near to a community is often strongly opposed. The covers of polytunnels can be and often are removed outside the growing season but the design of polytunnels makes removal and installation of the plastic covers an arduous and time-consuming task.

The present invention offers a very high level of functionality in the matter of water collection and conservation, a matter of immense importance in a world where many regions face water shortages during prolonged periods during the year, often amounting to severe drought conditions. When arrays of these new growing structures are in place, the surface area available for water collection will be substantial. Arrays of these new growing structures offer substantial opportunities to collect and conserve water, lessening dependence upon mains water and supplying water in places where mains water is unavailable. In order to accomplish that, a preferred embodiment of the present invention comprises a plurality of main wires, an anchorage structure, and a plurality of growing units with dual layer structures. Thus, the present invention is a system with modifiable components and configurations for growing, protected cropping, protected working, materials handling, water collecting and water conservation for use in vineyards and orchards.

SUMMARY OF THE INVENTION

An objective of the present invention is to provide a trellising system as a protected cropping system. The trellising system comprises dual layer structural units, which take the shape of triangular prisms.

The trellising system includes at least one core structure-group, a plurality of main wires, and anchorage structures. The core structure-group is made of a plurality of growing units, which will form the great majority of units. In most cases, the core structure-group further comprises one or more non-growing unit located in between the growing units or located at the end of row, with growing units to one side. The main wires include an upper sheet wire, an upper trellis wire, and optionally an overhead conveyor wire. One terminal end of each of the main wires is attached to the anchorage structure that provides support for the entire trellising system.

The growing units are made up of an outer layer and an inner layer. Each of the two layers takes the form of a long triangular prism, with the same length but different widths and heights. The outer layer includes the upper sheet wire, a lower sheet wire, a plurality of outer sloping wires, and a plurality of outer layer sheet materials (which may not be in position at all times). The outer sloping wires are connected to the upper sheet wire and the lower sheet wire to make an outer support sub-system. The outer layer sheet materials are kept in position in a tensioned state by various wires in the outer support sub-system.

The inner layer includes the upper trellis wire, which is one of the main wires, a plurality of trellis support wires, and a plurality of inner sloping wires. The trellis support wires include a plurality of upper trellis support wires and a plurality of lower trellis support wires. The inner sloping wires are connected with the upper trellis wire, the upper trellis support wires, and the lower trellis support wires to make a trellis support sub-system to support plant growing.

The trellising system also comprises equipment for bringing the sheet material into position when the sheet material is needed from a storage/dispensing drum, and the means to return the sheet material to the drum when the sheet material is not needed or it would be inadvisable to leave it in position, as when very severe winds are forecast.

Further, the anchorage structures will have attachments such as ratchet mechanisms which are capable of tensioning the plurality of main wires to which they are attached. Thus, the present invention is a system with modifiable components and configurations for growing, protected cropping, protected working, materials handling, water collecting and water conservation for use in vineyards and orchards.

DETAILED DESCRIPTION

All illustrations of the drawings are for the purpose of describing selected versions of the present invention and are not intended to limit the scope of the present invention.

The present invention provides a trellising system with an integrated dual layer structure. The system comprises modifiable components for growing, protected cropping, protected working, materials handling, water collecting, and water conservation for various agriculture uses. The trellising system is an aesthetically pleasing system that provides a wide range of benefits, including ventilation and protected cropping in agricultural crop-growing.

The main wires of the present invention extend along the length of the system. In one embodiment, the trellising system comprises at least one core structure-group, a plurality of main wires, and an anchorage structure. The core structure-group includes a plurality of growing units 100 and a plurality of non-growing units 200.

Figure 1:
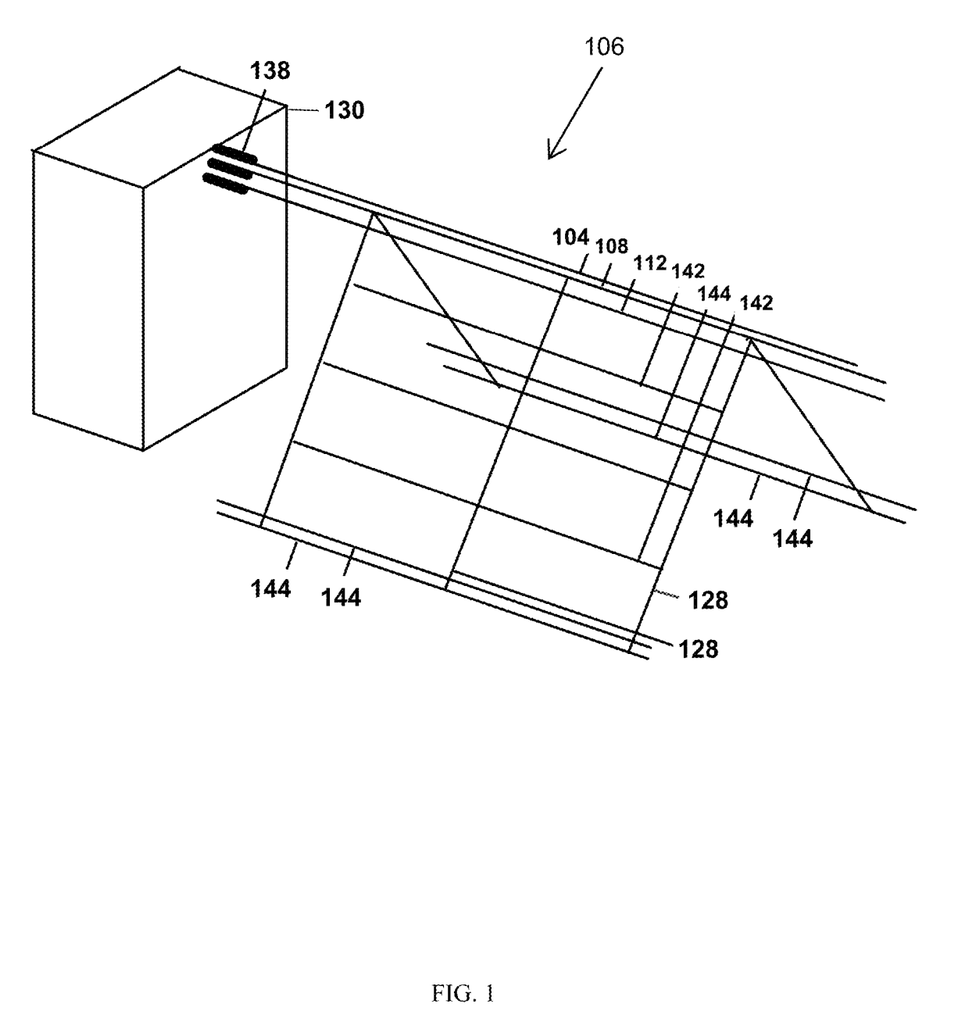
FIG. 1 is a drawing of an inner layer with a trellis support sub-system attached to the anchorage structure on the left according to an embodiment of the present invention.
Figure 2:
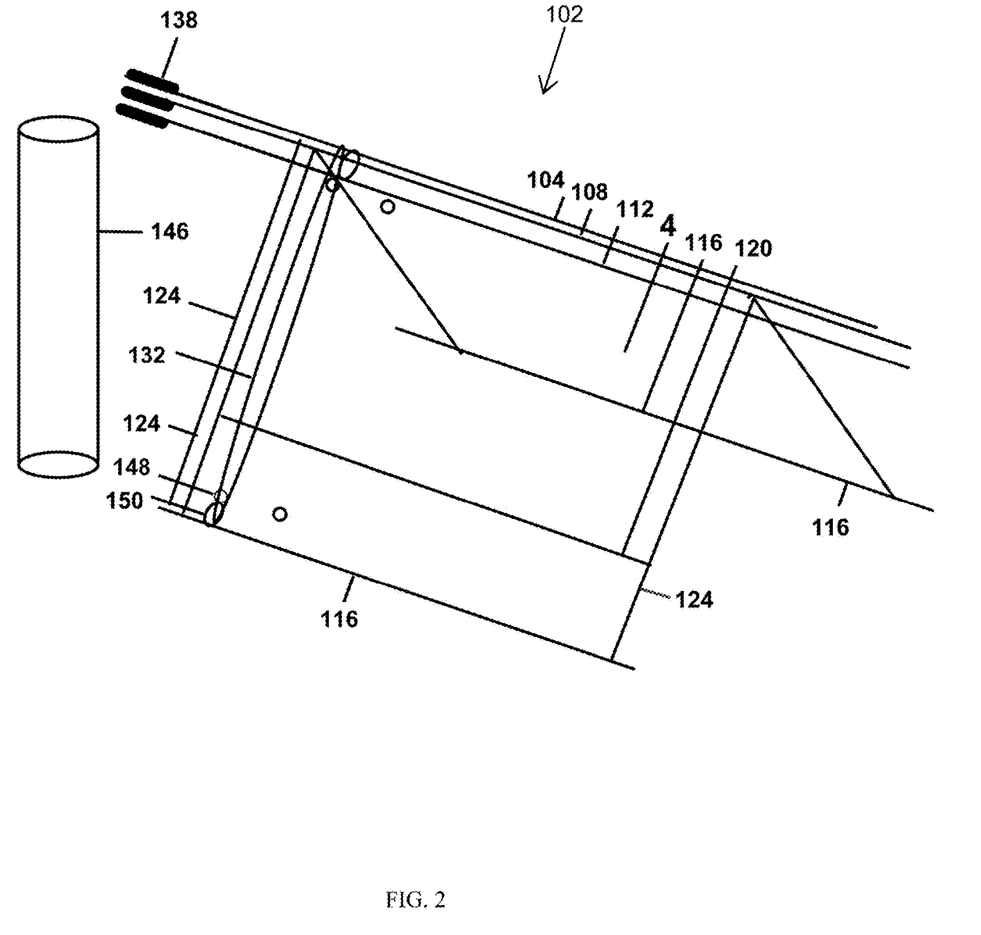
FIG. 2 is a drawing showing an outer layer with sheet material placed on the various sheet wires and a sheet spool adjacent to the growing unit according to an embodiment of the present invention.

Each of the growing units 100 comprises an inner layer 106 (FIG. 1) and an outer layer 102 (FIG. 2). The plurality of main wires, which include an upper sheet wire 104, an upper trellis wire 108, and optionally an overhead conveyor wire 112, passes through each of the growing units 100 and extends along the entire length of a row which comprises growing units and support activities. The main wires support the plurality of the sheet materials 132 that are kept in position in a tensioned state by various wires. One terminal end of each of the main wires is attached to an anchorage structure 130 through a ratchet 138. The anchorage structure 130 provides support to the entire system when experiencing external loads. The ratchet 138 includes a ratchet strap. When a wire is connected to the ratchet strap, the wire will extend beyond the triangular prism structure. As a result, a ratchet strap will be of restricted length—long enough to bridge the gap between triangular prism structure and anchorage structure.

According to one embodiment of the present invention, there are two anchorage structures located on either terminal end of the main wires which extend through one or more core structure-groups constituted in a row. The main wires anchored by the two anchorage structures are adjusted to be under a proper tension stress. The two anchorage structures may be different in structures. For example, one anchorage structure may be a small building while the other anchorage structure may be a post set in ground.

The overhead conveyor wire 112 is designed to transport a range of materials besides harvested crops. The overhead conveyor wire 112 can be installed permanently within the structure or can be removed as needed to ensure that headroom for exceptionally tall people is available. The overhead conveyor wire 112 is located below the upper sheet wire 104 and the upper trellis wire 108. The plurality of the lower sheet wires 116 and 120 (together with the upper sheet wire 104) supports the outer layer sheet material of the plurality of growing units and can be altered to allow for repositioning and ventilation into the system.

Referring to FIG. 1, there illustrated is a drawing of an inner layer 106. A trellis support sub-system is made by connecting the inner sloping wires 128 with the upper trellis wire 108, the upper trellis support wires 142, and the lower trellis support wires 144. The trellis support sub-system is attached to the anchorage structure 130 on the left according to an embodiment of the present invention. The plants are supported by the trellis support wires in the inner layer 106. The trellis support sub-system is to provide supports for agriculture plants grown over the various wires.

The inner layer 106 is the growing and material handling layer. At the apex of the inner layer is the upper trellis wire 108, which supports horizontal and sloping vertical wires—these in turn support the crop, e. g. grape vines, apples—grown as espalier crops, not as widely spaced bushes or trees—tomatoes. Some alternative uses of the horizontal and vertical wires are in connection with the use of the system as a polytunnel substitute. The inner layer 106 also comprises the overhead conveyor wire 112 for transfer of materials along the layer to a collection area or from a distribution area to a particular place in the growing area. The materials include, e.g., harvested grapes/apples/tomatoes as well as prunings from vineyard/orchard activities, biomass which can be used for heating.

As shown in FIG. 1, the plurality of the upper trellis support wires 142 and the lower trellis support wires 144 are designed to assist in withstanding wind gusts. The plurality of trellis support wires is to run along the length within the center area of the system. The plurality of trellis support wires further comprises the upper trellis wire 108. The upper trellis wire 108, which is one of the main wires, supports the plurality of lower trellis support wires and the load of the crops growing on the trellis. The plurality of trellis support wires in conjunction with each other maintains the plurality of the inner sloping wires 128 in position. Given the importance of protecting plants from wind damage, the system provides a very high degree of protection for plants grown in the system, since wind-resistant sheets can be installed quickly by dispensing the sheet material from the spool.

As shown in FIG. 1 again, the plurality of inner sloping wires 128 extends from the plurality of trellis support wires to create a triangular cross-sectional shape for the system when in a suitably tensioned state. The plurality of inner sloping wires 128 further allows for climbing plants such as a grape vine to climb up the wire and maintain its position within the system where the growth corresponds with the positioning of the wires.

The anchorage structure 130 further comprises a plurality of ratchet mechanisms 138 or other means of securing and providing sufficient tensile force for attachments, such as tensional chain. The anchorage structure 130 provides a sturdy force to secure the plurality of main wires 104, 108, and 112 along the top of the anchorage structure 130. The plurality of ratchet mechanisms 138 secures the plurality of main wires to the anchorage structure 130 to allow the user to easily adjust the tension of the upper main wires. The tension of the plurality of wires is maintained by the plurality of ratchet mechanisms 138 and the plurality of ratchet straps more specifically.

The ratchet mechanisms 138 are connected to anchorage structures 130, which are strong, heavy structures capable of withstanding any forces imposed upon them indirectly by the wires indirectly linked with them. The anchorage structures 130 may have one function, withstanding the applied forces, or may be multi-functional, combining this function with others, e. g. storage, places for the work of the operation, supports for climbing plants with aesthetic benefits. Small buildings with a variety of functions, e. g. storage of harvested produce, plant propagation facilities, large water storage containers, gabions.

The plurality of ratchet mechanisms 138 is designed with sufficient rating for any likely forces, allowing a safety margin. Ratchet straps can be multi-functional. For example, they can connect components, provide tensioning of wires, and support other components, for example, sheet materials for the roofing of simple shelters. The same objectives can be achieved using a chain, obtainable in a very wide range of sizes and degrees of structural strength. In this application, heavy chain is appropriate. Tensioning of the chain is achieved by the insertion of a bolt through two links of the chain, the links separated by a distance which allows the bolt to fit. A nut inserted onto the bolt can then be tightened with a spanner to achieve different values of tension.

The anchorage structure 130 may take form of an intermediate bulk container. In practice, the bulk containers may be used in groups. The containers are stored vertically to give sufficient height for anchorage of support wires. The containers are often placed horizontally as well. In this case, water storage containers—containers different from the rectangular structures referred to as 'intermediate bulk containers' can be used, positioned differently. For example, the water collected by the gutters can be diverted to water storage containers in the ground, at the end of a line of guttering. However, the anchorage structure can be supplied by other means, such as small buildings.

Referring to FIG. 2, there illustrated is a drawing showing an outer layer 102 and a sheet spool 146 positioned next to the growing unit according to an embodiment of the present invention. The outer layer 102 is the sheet and sheet support layer. The upper sheet wire 104, the multiple sloping wires 124, and the lower sheet wires 116 and 120 are connected to form an outer support sub-system for supporting the sheet materials 132. The outer support sub-system can be altered to allow for repositioning to let ventilation into the trellising system.

The outer layer 102, which is the sheet and sheet support layer. At the apex is the upper sheet wire 104 and very near to ground level is the lower sheet wire. These wires support sheet materials with various functions, e.g. when polythene or other suitable sheeting is put in place, raising the internal temperature of the growing volume to protect crops from frost, to increase the growth rates of plants or to enable a wider range of crops to be grown (such as grape varieties which without protection could not be grown in a cool climate). Other advantages to be gained by the use of this sheeting: enhancing the well-being of workers, collecting water for the purposes of water conservation. The water collected can be used for irrigation of the crops, decreasing reliance upon mains water. (When the sheet material is removed, the crop is watered by natural precipitation.) Netting material can be used to protect the crops inside the structure from pests.

As shown in FIG. 2, an outer layer sheet material 132 is placed on the upper sheet wire 104 and secured at the bottom by a plurality of a lower sheet wires 116 and 120. In a preferred embodiment, the outer layer sheet material 132 is designed using a polythene sheeting material to raise the internal temperature of the growing area to protect crops from frost, an increase of growth rates, and enable a wider range of crops to be grown within the system. The outer layer 102 collects water along the surface that can be later used for the irrigation of crops, decreasing the reliance upon a main water source. The outer layer 102 can further be removed to allow the agriculture within the system to be watered naturally by precipitation. Furthermore, the outer layer 102 can be designed with a netting material or other material to protect the crops within the system against various pests and unfavorable conditions.

In FIG. 2, there illustrated also is a laying out of the outer layer sheet material 132 over various outer wires. Principally, sheet material 132 is a plastic sheeting, but sheet material may also include solar protection sheeting for very hot conditions and netting for protection of crops against pests, particularly birds.

The outer layer sheet material 132 includes a plurality of eyelets 148. The plurality of eyelets 148 is positioned in three horizontal rows along the sheet material 132. The sheet material 132 is attached to the outer support sub-system, which comprises the upper sheet wire and the plurality of lower sheet wires, by a plurality of fasteners 156.

As shown in FIG. 2, the present invention utilizes a sheet spool 146. The sheet spool 146 is used for storage of sheet material 132 and for dispensing sheet material at this end of a particular row. More than one spools are possible to be placed in a row to supply a short row of growing units. When the sheet spool 146 is used for storage of the sheet materials 132, the sheet materials are dispensed when needed and taken back into the sheet spool when not needed. Thus, the sheet materials 132 are rolled up and stored in a vertical position but are dispensed to faces which have a plurality of the sloping wires 124 to provide support. The outer layer sheet material can be dispensed, with the sheet material spool rotating freely without excessive frictional forces.

The sheet spool 146 further comprises a turntable on which it rotates that may also be assisted by the action of a winch, which is located inside of the inner layer some distance from the sheet spool 146. A wire (or rope) from the winch is connected to a gripping device put in place at the end of the sheet material before action begins to bring it into position on the sheet layer. The gripping device secures the outer layer sheet material which can be pulled over the system.

Figure 3:
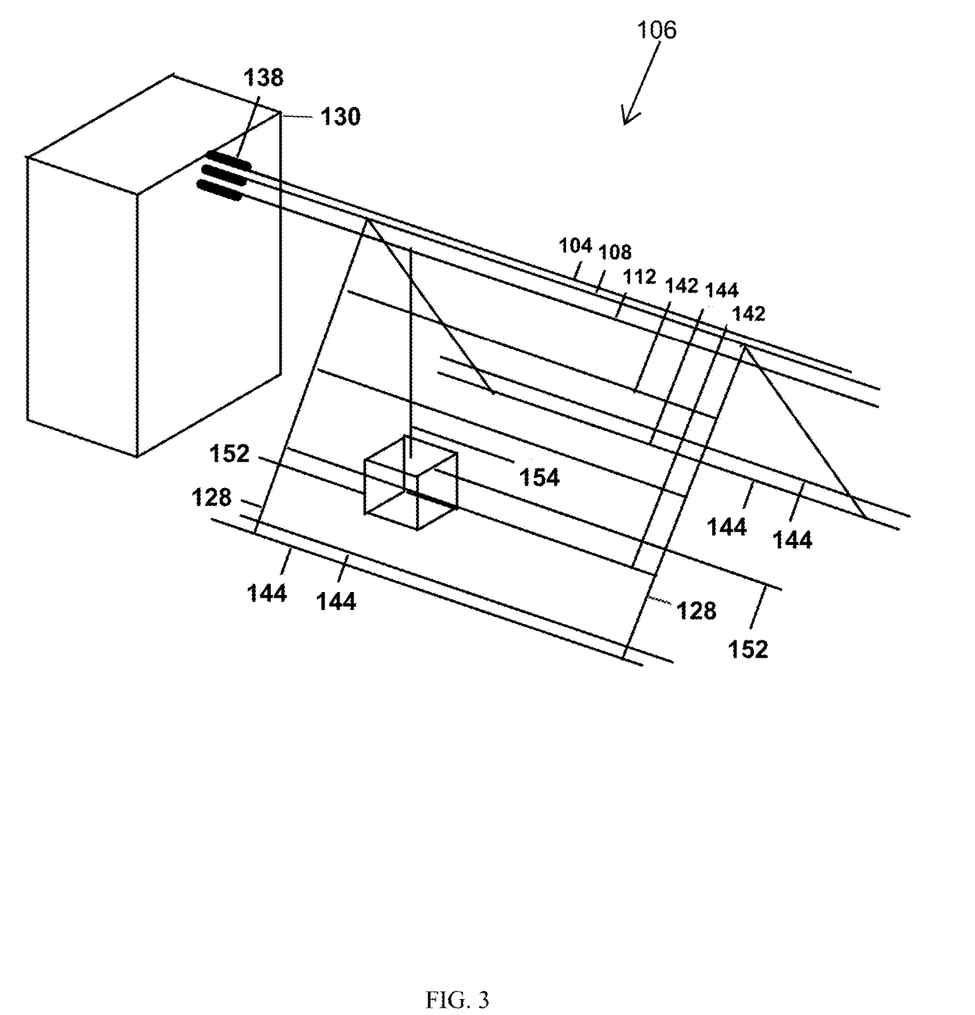
FIG. 3 is a drawing showing an overhead conveyor structure with a load hanging over the overhead conveyor wire within the inner layer according to an embodiment of the present invention.

Referring to FIG. 3, there illustrated is a drawing showing an overhead conveyor structure in the inner layer 106 according to an alternative embodiment of the present invention. In the embodiment the inner layer 106 enables the growing and materials handling. Various methods of transferring materials can be used inside the structure and outside the structure. Within the structure, the overhead conveyor wire 112, which is one of the main wires, runs the length of a growing row and provides a convenient way of supporting various loads 152, suspended from a wire 154 secured to the overhead conveyor wire 112. The loads 152 can then be moved by a wire that is secured to the opposite side of the load. While convenience in transportation is one advantage, workers in vineyards and orchards commonly carry loads which are excessive and which can lead to injury. Loads 152 suspended from the overhead conveyor wire 112 can hold harvested crops until they are moved, with no need to weigh down the worker, reducing risk for injury. Once the harvesting is complete in a section of the growing structure, then the loads can be moved by attaching a winch wire to the load in order to move the load.

Figure 4:
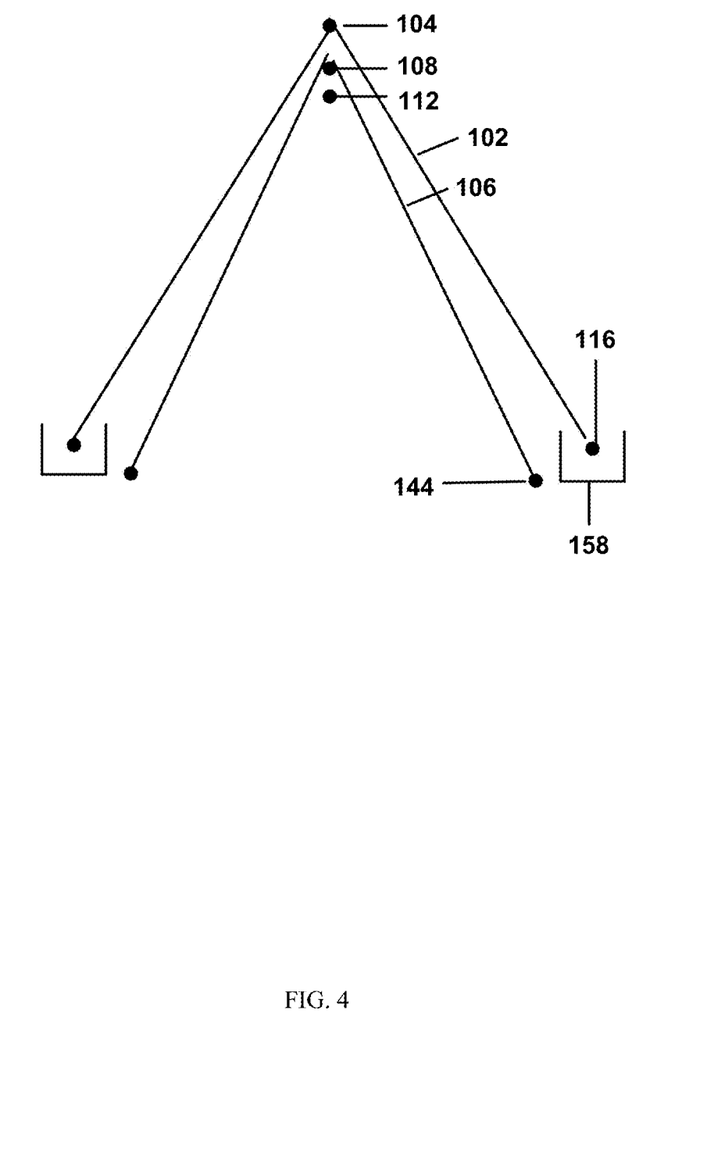
FIG. 4 is a side view showing the dual triangular prism structure according to an embodiment of the present invention.

Referring to FIG. 4, there illustrated is a side view showing a dual triangular prism structure according to an embodiment of the present invention. The structure comprises an outer layer 102 with an outer support sub-system, an inner layer 106 with a trellis support sub-system, and a plurality of gutters 158. Further, the structure shows the main wires, which are the upper sheet wire 104, the upper trellis wire 108, and the overhead conveyor wire 112, which are located at apex of the triangular prism structure. The plurality of gutters 158 receives water which runs down the two faces of plastic sheet material. The gutters 158 transport water to water storage facilities, such as Intermediate Bulk Containers. Water may well be able to reach underground water storage containers without the need for pumping.

As shown in FIG. 4, the gutters 158 are at ground level, which are placed so as to collect the water running down from the plastic sheet material when it has been dispensed from a sheet spool at the end of row and when the sheet material is in place.

Figure 5:
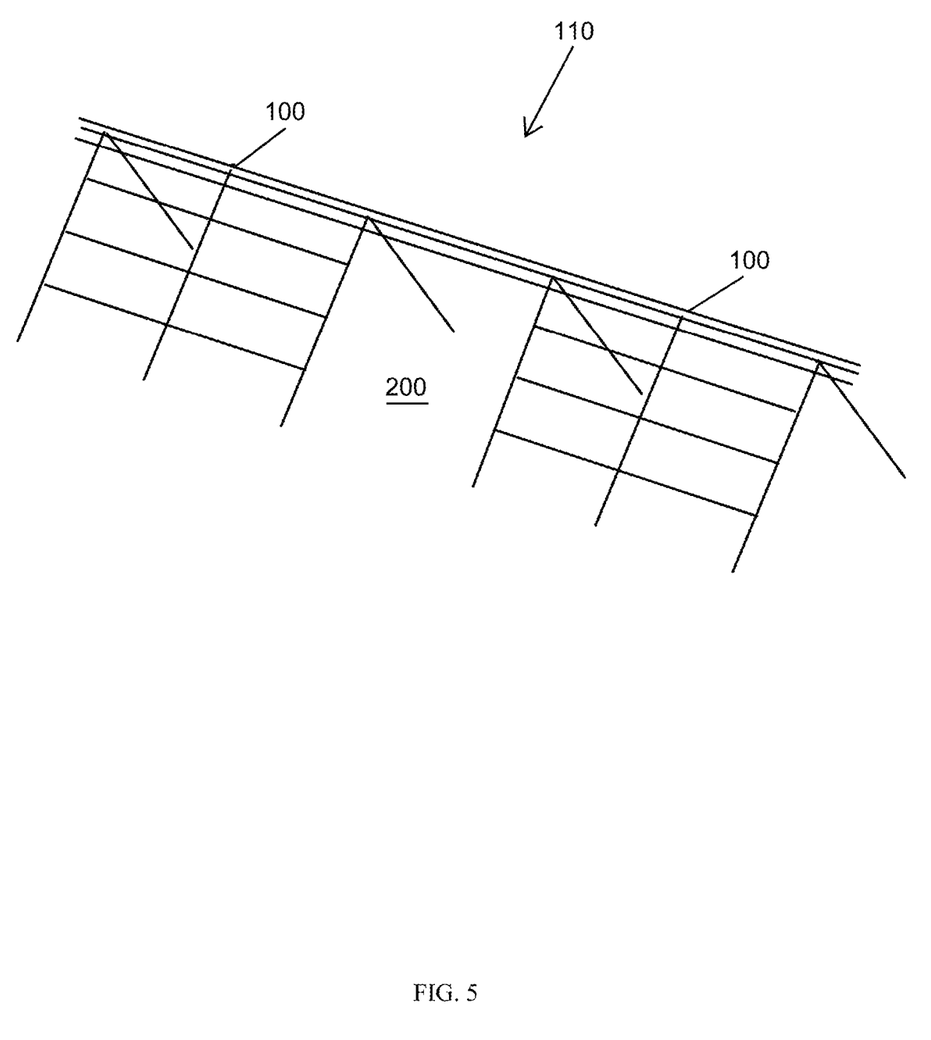
FIG. 5 is a drawing of a core structure-group comprising a non-growing unit among multiple growing units according to an embodiment of the present invention.

Referring to FIG. 5, there illustrated is a drawing of a core structure-group 110 comprising a non-growing unit 200 among multiple growing units 100 according to an embodiment of the present invention. The non-growing unit 200 has various functions, one of which is to provide shelter for employees of the operation and visitors to the operation. Non-growing unit 200 also provide a means for going from one side of a row to the other without the need to go to the end of a row.

The main wires, including the upper sheet wire 104, the upper trellis wire 108, and the overhead 112, run the length of the core structure-group 110. The trellis support wires including a plurality of the upper trellis support wires 142 and a plurality of the lower support wires 144, and the upper and lower sheet wires do not themselves extend beyond the triangular prism structure in one variant of the design but are connected to ratchet straps, which extend from the triangular prism structure to the ratchet mechanisms 138. The ratchet mechanisms 138 is one way of exerting tensioning forces on the wires to which they are connected.

The sides of the non-growing unit 200 may be left open but more often, there will be plastic sheeting sides available which can be rolled up or down or plastic sheeting or other material which covers some but not all the two faces, with a door on each side and if desired windows on one or both sides. The surfaces may include oak, larch, or other paneling. Furthermore, the aesthetics may blend in with the vernacular architecture of the area or form an arresting contrast. The plurality of growing units requires structural integrity and strength provided by a plurality of wires of different diameters and other physical properties.

Figure 6:
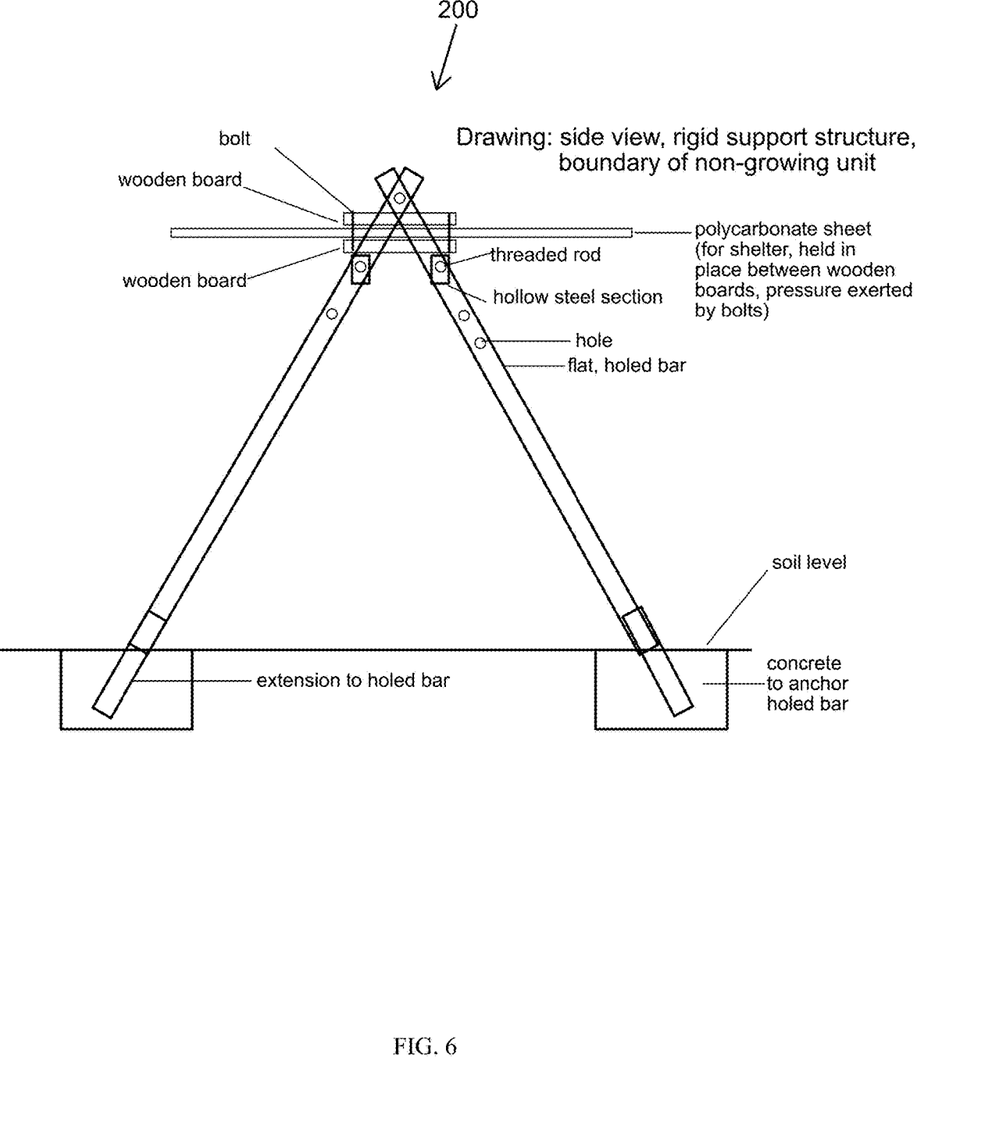
FIG. 6 is a side view of the non-growing unit according to an embodiment of the present invention.

Referring to FIG. 6, there illustrated is a side view of the non-growing unit 200 according to an embodiment of the present invention. In a non-growing unit 200, there is a need for structural strength and rigidity with various rigid materials such as polycarbonate sheet materials and a plurality of bar structures. The non-growing unit 200 further comprises a plurality of strong perforated steel bars. The plurality of perforations extends the length of the bars. The plurality of steel bars further comprises two circular holes that are used for securing the ends of a plurality of threaded steel rod. The plurality of threaded steel rods further comprises a plurality of metal connector nuts which are joined by the plurality of metal connector nuts. The plurality of steel bars support a bar of timber, securing a polycarbonate sheet material. When a non-growing unit 200 is used for shelter, then sheeting material for the two sloping sides will often be useful.

The non-growing units 200 have various possible functions. One is provision of shelter for employees of the operation and visitors to the operation. Shelter is provided in the growing areas which make up most of the rows, but shelter in non-growing areas is convenient and useful.

Non-growing units 200 also provide a means for going from one side of a row to the other without the need to go to the end of a row. The facility can be used by people on foot as well as by mechanized transport, provided the transport is small enough to use the facility.

As shown in FIG. 6, the polycarbonate sheet materials form the walls of non-growing units and is secured at the base to ensure the polycarbonate sheet materials is curved. This design ensures that the polycarbonate sheet material is resistant to wind forces and can be easily removed if very strong winds expected. The polycarbonate sheet materials can further be designed with different opacities and degrees of light transmission to prevent or reduce excessive heating and create various shade parameters. Further, the plurality of steel bars extends below the soil level and can be anchored with a holed bar within a concrete anchor area. This further provides structure for the plurality of steel bars crossed into a X-shaped cross section along the top with a bar creating the conjuncture.

Figure 7:
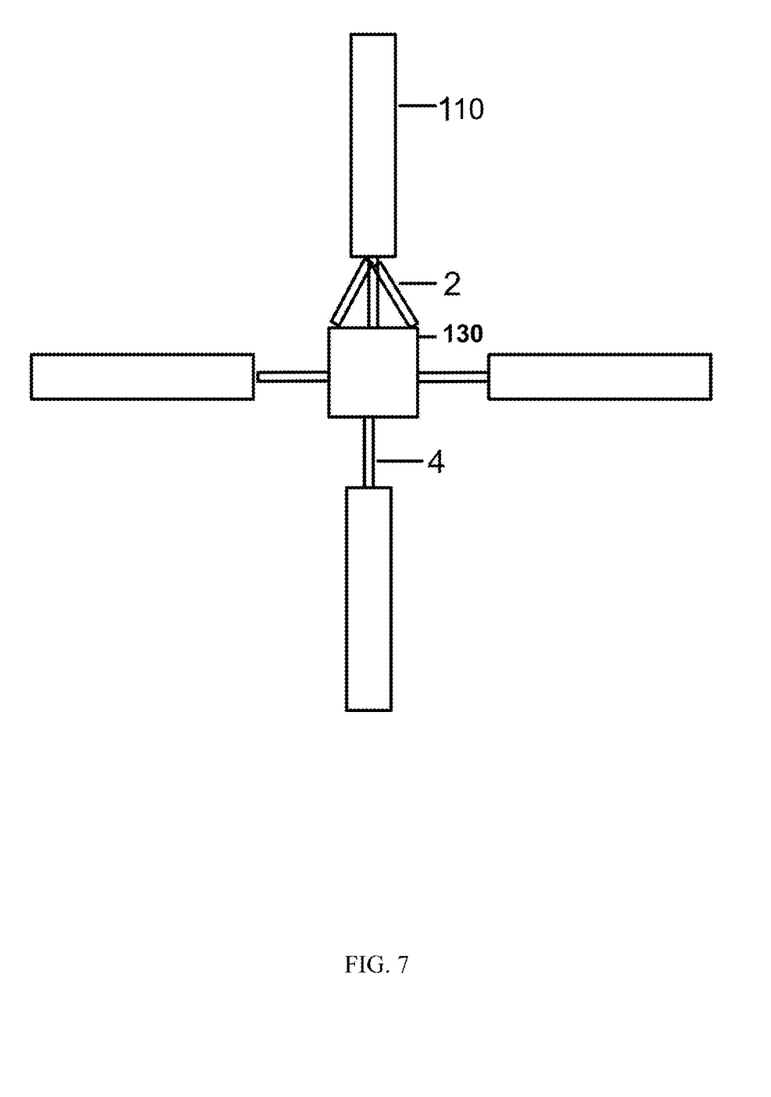
FIG. 7 is a potential assembly of a plurality of core structure-groups according to an embodiment of the present invention.

Referring to FIG. 7, there illustrated is a potential assembly of core structure-groups 110 according to an embodiment of the present invention. As shown in FIG. 7, the anchorage structure 130 is placed in the center with four rows of the core structure-groups 110 extending perpendicularly attached with a plurality of ratchet straps. Positioned within the center could alternatively be a small building, Intermediate Bulk Containers placed one on top of the other, or gabion containers for example. The Intermediate Bulk Containers take the form of a large plastic storage cube within a strong framework. Gabion containers take the form of a cube made of strong metal wire containing rocks or other materials.

FIG. 7 shows one way of arranging rows of core structure-groups which include growing units/non-growing units to connect with the anchorage structure 130. As shown in FIG. 7, 110 is a row of growing units/non growing units, whilst 2 and 4 are main wires extending from these units to the anchorage structure, together with the tensioning devices, such as ratchet straps and the actual fixing to the anchorage structure.

Furthermore, various plants such as the vine *Vitis vinifera* Brandt or *Humulus lupulus* 'Aureus,' the golden hop plant can grow along the framework and disguise the framework. These plants further provide a much easier way of implementing a 'green roof' than lifting tons of soil or other growing medium to the roof and sowing plants such as species of Sedum there. Furthermore, the anchorage structure 130 may be a large building such as a winery, containing all the necessary equipment and supplies for making wine from the grapes, but a winery which also acts as an anchorage structure, securing the wires from the crop rows.

Figure 8:
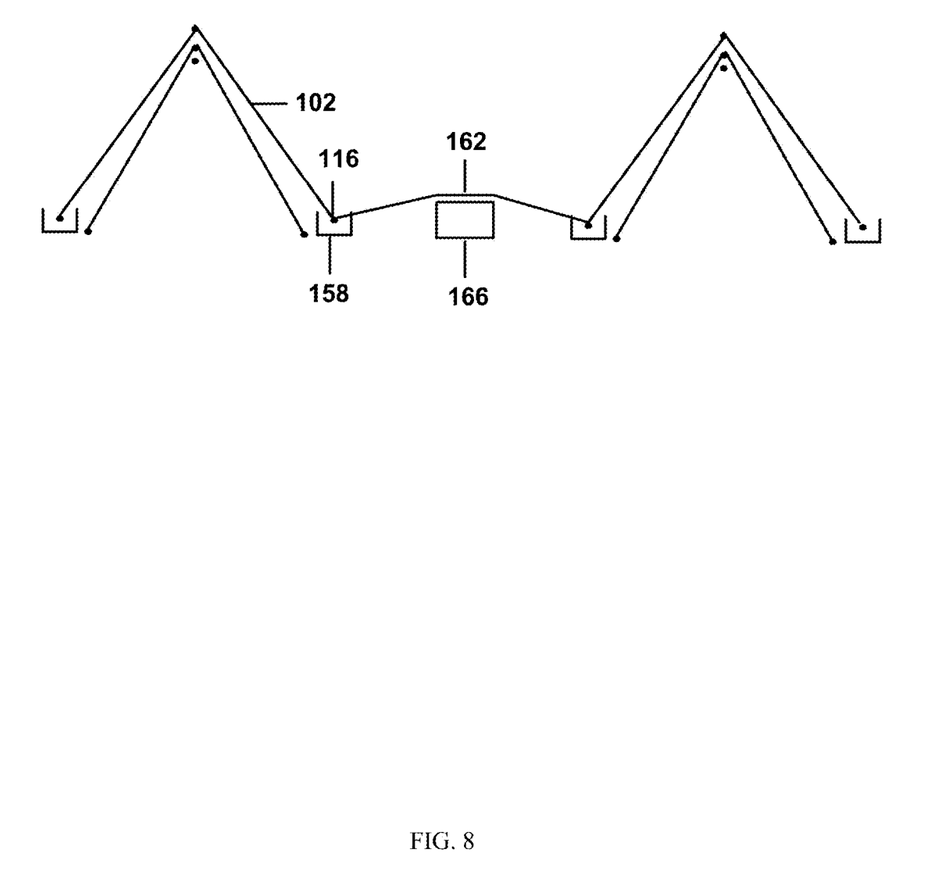
FIG. 8 is a side view of two rows of growing units with attached gutters according to an embodiment of the present invention.

Referring to FIG. 8, there illustrated is a side view of two rows of growing units 100 with attached gutters 158 according to an embodiment of the present invention. In this alternative embodiment, a plastic sheeting is installed on the rows of growing units 100 and a water-collecting surface is available which may be very large. The more rows and the longer the rows, the greater the surface area available for water collecting. Furthermore, water collecting surfaces can be installed in the rows between the growing units 100 as the inter-unit row sheets 162. The material 162 of the surface may be different from the outer layer sheet layers 132 on the growing units. The material could be scaffolding sheeting that is a strong and cost-effective material, equipped with rows of eyelets which allow ready fixing of the material to the upper and lower sheet wires 116 and 120 by means of elasticated loops 150. The same material may be used for the inter-unit row sheets 162, if the width of the sheets is suitable to cover the width of the inter-unit rows, allowing for the raising of these sheets in the center. Further, more than one scaffold sheet, side by side, gives a means of covering greater row widths.

The inter-row sheet 162 is installed between rows of growing units (or rows of growing units with intra-row non-growing units) and an additional water-collecting surface becomes available which may be very large. A potential layout could be used in the setting of a large garden, where practical growing is combined with other activities, such as the growing of ornamental plants. The spaces around the rows could be lawns or a semi-wooded area.

The center of the inter-unit rows supports the inter-unit sheet material with a continuous raised structure in tension running the length of the inter-unit row so that the water can run down the sheet due to gravity. Furthermore, the supports are easily movable via tractor equipment. Examples of supports are as follows: straw bales, pallets and specially designed supports of wood, lightweight metal, or plastic. Straw bales are protected by the sheet material from precipitation with an impermeable covering will also be between the straw bales and the ground. Furthermore, the sheet material can be used for inter-unit row water collecting, weed killing in the inter-unit rows, suppressing weeds by solarization, over-heating weeds, and depriving weeds of light. Further, the plurality of gutters below the lower edges of the expanses of water-collecting material can easily direct water to water-storage containers if the ground slopes at a convenient angle along the length of the plurality of gutters.

Referring to FIG. 9, there shown are schematic illustrations of potential uses of the present invention within a vineyard. As shown in FIG. 9A, two growing units are aligned in parallel. To the left of the growing units is an anchorage structure, which may be a small building or a group of stacked intermediate bulk containers. As shown in FIG. 9B, two growing units are covered along approximately half their length with plastic sheet material dispensed from the two spools located at left of the growing units. The structure at the left side of FIG. 9B is an anchorage structures which may be water storage containers or small buildings. Such structures may have a single function or more than one functions. As shown in FIG. 9C, two growing units are not covered with plastic or other material. A non-growing unit, located in between the two growing units, may have multiples uses, such as allowing entry and exit to the growing units by small tractors/machinery as well as workers/visitors, storage of equipment. Above the non-growing unit are projecting parts, positioned approximately horizontal to the ground with functions including to increase the sheltered area. As shown in FIG. 9D, the two growing units are covered with plastic sheet material, which has multiple functions, e.g. raising the internal temperature for increased crop growth, protection of workers from rain whilst harvesting crops, water collecting, and distributing collected water to gutters. The spools, located at left of the growing units, are for storing sheet materials, which are now empty.

Figure 9A:
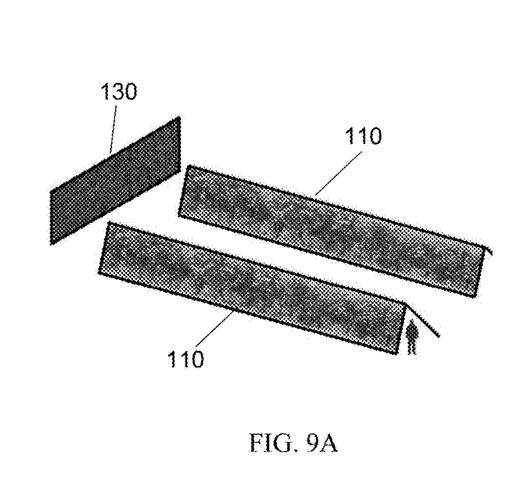
FIG. 9A is a schematic illustration of a first potential use of the present invention within a vineyard according to an embodiment of the present invention.
Figure 9B:
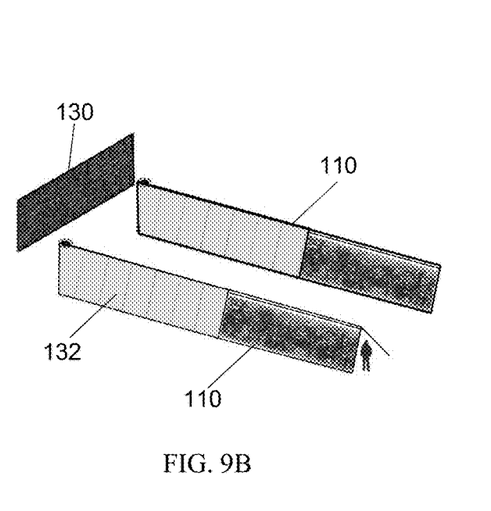
FIG. 9B is a schematic illustration of a second potential use of the present invention within a vineyard according to an embodiment of the present invention.
Figure 9C:
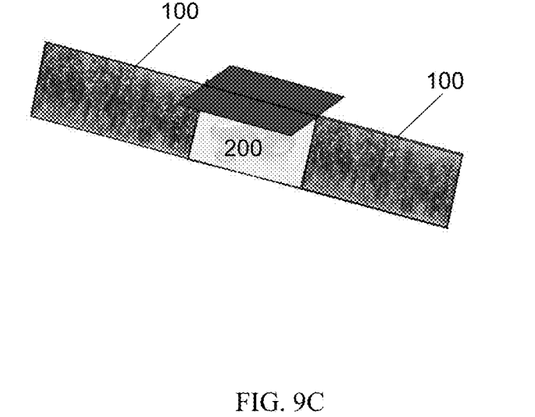
FIG. 9C is a schematic illustration of a third potential use of the present invention within a vineyard according to an embodiment of the present invention.
Figure 9D:
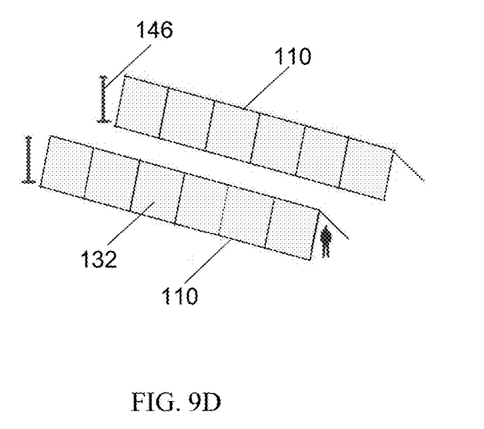
FIG. 9D is a schematic illustration of a fourth potential use of the present invention within a vineyard according to an embodiment of the present invention.

Referring to FIG. 9C, the ends of the non-growing unit 200 are bounded by the sloping holed steel bars. A convenient way of securing the sheeting material to these steel bars, allowing for rapid installation of the sheet material on a non-growing unit and rapid removal of the sheet material is the use of small, powerful magnets such as circular or cubic neodymium magnets.

This design allows substantial water-collecting capacity within the area of the vineyard, orchard, or other farming operation. The sheeting can be removed from the growing units, allowing natural precipitation to water the crops in these units. The inter-unit row material still allows for pedestrian traffic within the growing units as there is no sheet material on the ground within these units. The inter-unit row further has eyelets on the sides that are secured to the lower sheet wires with an elastic shock cord to secure the lower ends of the water-collecting unit sheet material to the lower sheet wires.

As in the case of smaller structures, climbing plants may be used to enhance the appearance of the structure. Further, the choice of a grid configuration for the rows creates various growing possibilities. For example, if rows running North-South are preferred, with the further preference that the vineyard should resemble one of the vast number of vineyards which have ordered rows without nearby buildings or with buildings out of sight, then one choice would be a long anchorage structure running West-East and, quite some distance away, a similar anchorage structure also running West-East and to the South of the first structure, both structures hidden by hedges, and in the expanse of land between the two, the long rows of vines, apple trees or other plants which are grown, the wires from the rows passing through the hedges to the completely or partially hidden anchor structures. The anchorage structures could have only this function, support, and tensioning of the wires, or could take the form of multi-functional long buildings.

Figure 10:
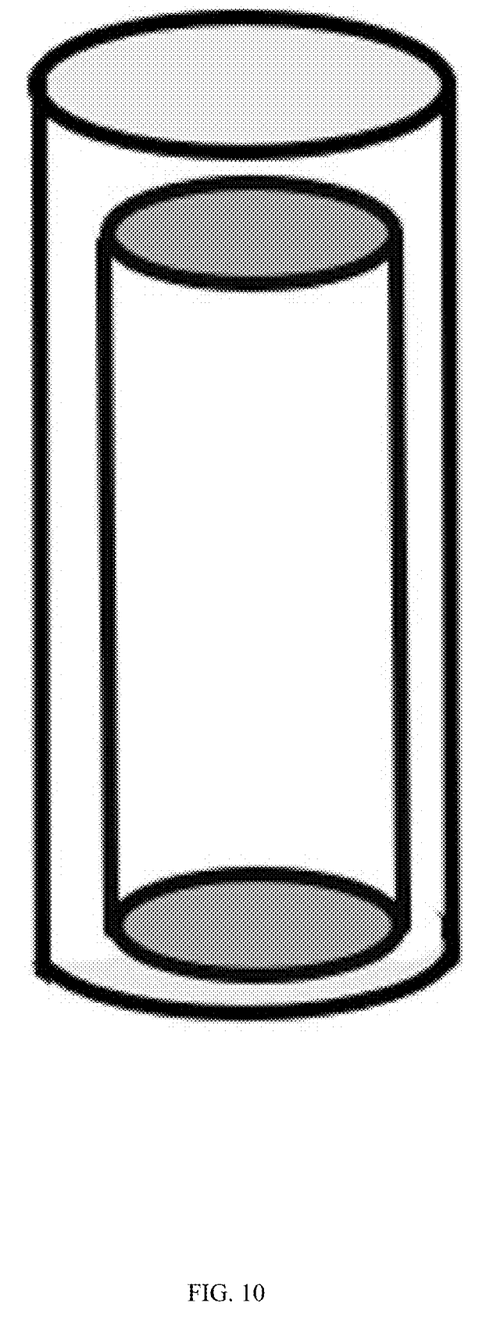
FIG. 10 is a front view showing a sheet spool comprising a dual layer construction according to an embodiment of the present invention.

Referring to FIG. 10, there illustrated is a drawing showing an alternative sheet spool 147 which comprises a dual layer construction according to an embodiment of the present invention. The dual layer construction of the sheet spool 147 adds an additional layer to protect the sheet against adverse weather conditions.

Figure 11:
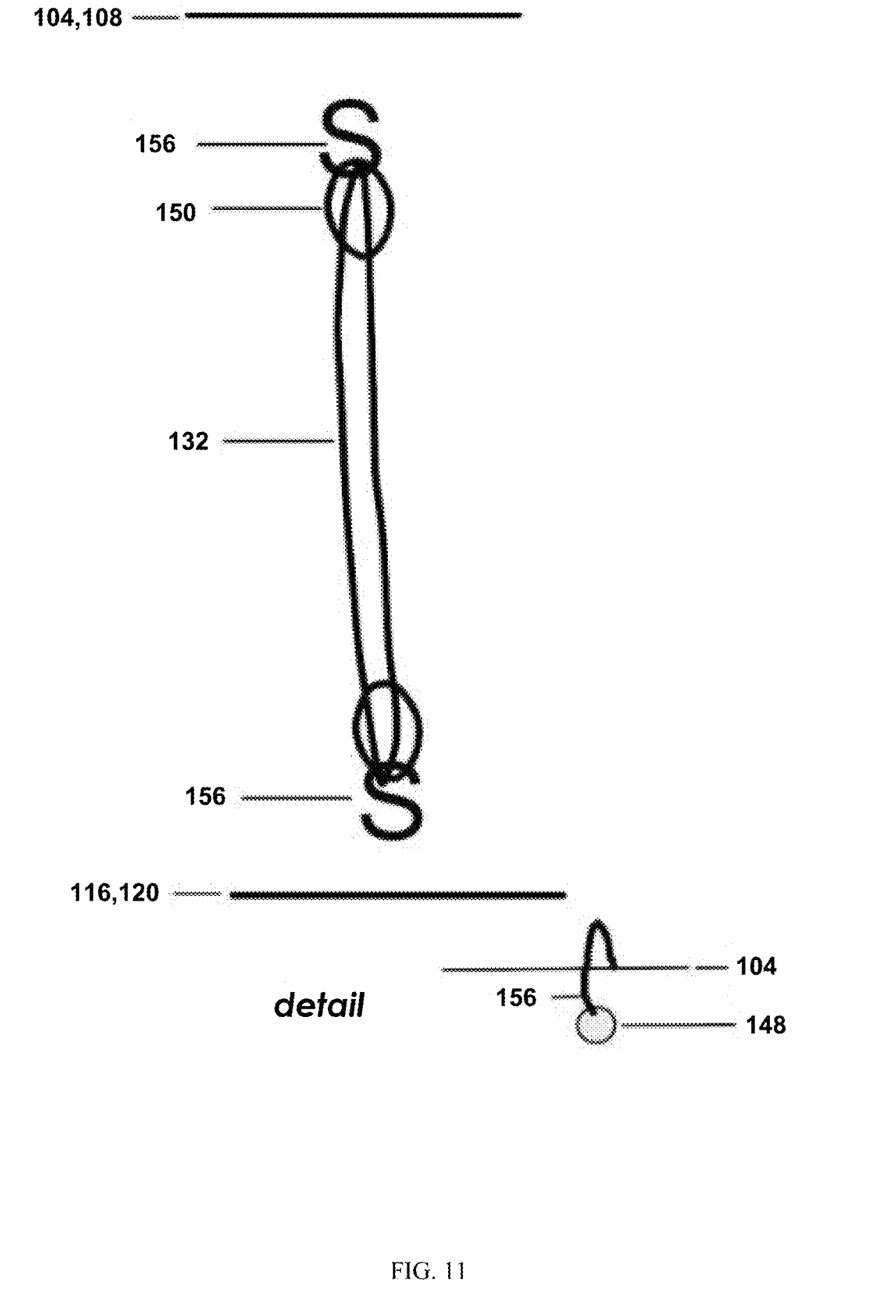
FIG. 11 is a schematic illustration of tensioning elastic shock cord loops for attaching the outer layer sheet material to the outer support sub-system according to an embodiment of the present invention.

Referring to FIG. 11, there illustrated is a fastening mechanism of the fasteners 156 to attach the outer layer sheet material 132 to the outer support sub-system. As shown in FIG. 11, one or more than one of the main wires, such the upper sheet wire 104 and the upper trellis wire 108, comprises a plurality of elastic loops 150 located on the wires. One or more than one of the lower sheet wires 116 and 120 also comprises a plurality of the elastic loops 150 located on the wires. The fasteners in "S" shape connect the elastic loops 150 to eyelets 148 located in the outer layer sheet material 132. By this fastening mechanism, the outer support sub-system secures the top and bottom sides of the outer layer sheet material 132 at the plurality of eyelets 148 to the plurality of wires. This design creates a structure where the outer layer sheet material 132 is kept in tension.

Some of the wires which run the length of the growing unit (the trellis support wire, the lower sheet wires) do not themselves extend beyond the growing unit with a triangular prism structure in one variant of the design. The main wires run the entire length of a row of core structure-groups and are connected to ratchet straps, which extend from the triangular prism structure to the ratchet mechanisms, the means of exerting tensioning forces on the wires to which they are connected.

Although the invention has been explained in relation to its preferred embodiment, it is to be understood that many other possible modifications and variations can be made without departing from the spirit and scope of the invention.

What is claimed is:

1. A trellising system for growing crops in the system, comprising at least one core structure-group, a plurality of main wires extending along an entire length of a row constituting the core structure-group, and multiple anchorage structures,
    wherein the core structure-group includes a plurality of growing units,
    wherein the plurality of the main wires includes an upper sheet wire and an upper trellis wire,
    wherein one terminal end of each of the main wires is attached to a first anchorage structure, and the other terminal end of each of the main wires is attached to a second anchorage structure,
    wherein the terminal ends of each of the main wires are attached to the anchorage structure by a ratchet mechanism, wherein the ratchet mechanism includes a ratchet strap,
    wherein the growing unit includes an outer layer and an inner layer,
    wherein the outer layer includes the upper sheet wire, a lower sheet wire, a plurality of outer sloping wires, the plurality of the outer sloping wires arranged vertically and adjacently connected with the upper sheet wire and the lower sheet wire to form an outer support sub-system, and a plurality of outer layer sheet materials placed on the outer support sub-system,
    wherein the inner layer includes the upper trellis wire, a plurality of trellis support wires including a plurality of upper trellis support wires and a plurality of lower trellis support wires, and a plurality of inner sloping wires, the inner sloping wires arranged vertically and adjacently connected with the upper trellis wire, the upper trellis support wires, and the lower trellis support wires to form a trellis support sub-system,
    wherein the plurality of the outer layer sheet materials is secured to the outer support sub-system by a plurality of fasteners fastening a plurality of elastic loops located on the wires of the outer support sub-system to the eyelets located in the outer layer sheet material so that the outer layer sheet materials are tensioned by the wires of the outer support sub-system, and
    the trellising system further comprising a plurality of gutters for receiving water running down surfaces of the outer layer sheet materials.

2. The trellising system of claim 1, wherein the core structure-group further comprises a non-growing unit, the non-growing unit having the main wires extended through the unit.

3. The trellising system of claim 1, wherein the plurality of the main wires further comprises an overhead conveyor wire located below the upper trellis wire and within the inner layer.

4. The trellising system of claim 3, wherein the overhead conveyor wire is removable from the system.

5. The trellising system of claim 3, wherein a load vessel is connected to the overhead conveyor wire through a hanging wire for transporting a load in and out of the trellising system.

6. The trellising system of claim 1, wherein the growing unit comprises a sheet spool for storing and dispensing the sheet material.

7. The trellising system of claim 1, wherein the trellis support sub-system of the growing unit forms a triangular prism.

8. The trellising system of claim 1, wherein the outer layer sheet materials are selected from a group including plastic sheeting, solar protection sheeting, and netting.

9. The trellising system of claim 8, wherein the plastic sheeting is selected from a group including polythene, polypropylene, and polycarbonate.

* * * * *